(No Model.)
F. McKIMMY.
WASHING MACHINE.
No. 310,698. Patented Jan. 13, 1885.
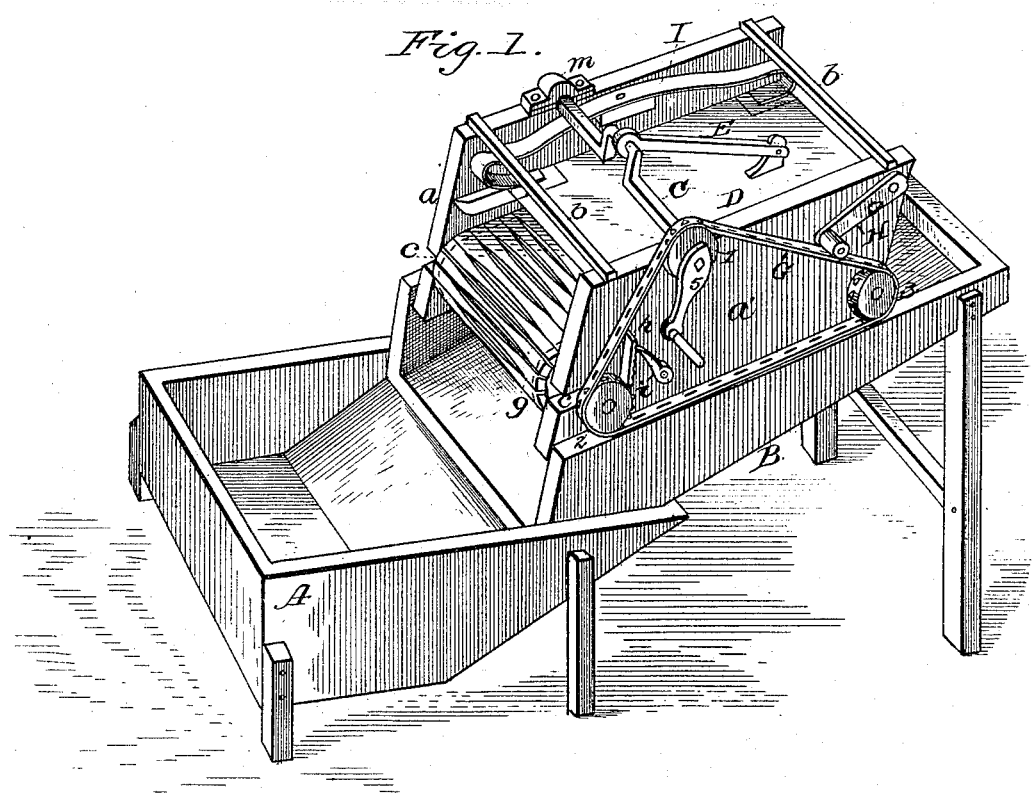
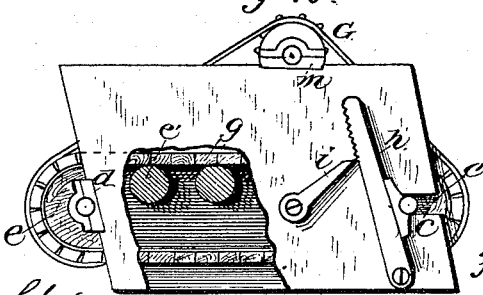
Attest.
J. W. Reynolds
Edward E. Ellis
Inventor:
Fred McKimmy
By O. C. Duffy
Atty

UNITED STATES PATENT OFFICE.

FRED McKIMMY, OF BEAVER DAM, OHIO, ASSIGNOR OF ONE-HALF TO JOHN E. LUGIBILL, OF SAME PLACE.

WASHING-MACHINE.

SPECIFICATION forming part of Letters Patent No. 310,693, dated January 13, 1885.

Application filed December 4, 1883. (No model.)

*To all whom it may concern:*

Be it known that I, F. McKIMMY, of Beaver Dam, in the county of Allen and State of Ohio, have invented certain new and useful Improvements in Washing-Machines; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to washing-machines; and it consists in such details of construction and combination of parts, as will be hereinafter distinctly pointed out.

Referring to the drawings hereunto annexed, Figure 1 represents an isometrical view of the apparatus complete; and Fig. 2 represents a side view, partly broken away, of the machine proper.

Referring to the letters marked thereon, A represents the tank or receptacle for holding the water, its rearward end being inclined, as shown, and the whole supported on suitable legs.

B represents an inclined trough, whose forward end rests in and is supported by the inclined portion of the tank A, while its rear end is supported by legs which are of greater vertical height than the supports of the tank, in order that said trough may be maintained at a sufficient inclination, for the purpose to be hereinafter described.

The machine proper consists of two sides, $a\ a'$, which are held together at the top by strips $b\ b$, said sides being held and supported in any suitable manner between the sides of the inclined trough B, as shown. These sides $a\ a'$ are recessed or slotted at their forward end, as shown at $c$, while to the rear end thereof, and in the same plane with said slots, are secured suitable bearing-plates, $d$. These plates $d$ and slots $c$ are for the reception and support of the shaft of a roller, $e$, which is located at each end of the machine, between the sides $a\ a'$, and carrying an endless slotted belt, $g$.

Located on each side of the machine, immediately behind the shaft of the forward roller, is a movable ratcheted bar, $h$, which is engaged by a pawl, $i$. These constitute a tightener for the slotted belt, and are operated by pushing forward the upper end of the bar and allowing the pawl to fall until said bar is engaged sufficiently firm, thereby tightening the belt.

Supported between the sides $a\ a'$, intermediate of the rollers $e$, and having their upper surface in the same horizontal plane with said rollers, are three, four, or more smaller rollers, $e'$. These smaller rollers assist in the progress of the belt during the washing process, and serve to prevent any depression of said belt, so that an even rolling-surface is maintained.

Suspended across the top in bearings $m$ is a crank rod or shaft, C, which is connected with the "rubber" D by the pitman E. Said crank-shaft has on one end, out from or beyond the side $a'$, a sprocket-wheel, 1, which is connected by a sprocket-belt, G, with similar wheels, 2 3, secured, respectively, to the corresponding end of the shafts of rollers $e$. By turning the crank 5, on the outer end of the shaft C, a longitudinal reciprocating motion is imparted to the rubber D, while the slotted belt $g$ is caused to travel by revolution of the rollers $e$.

H is an arm carrying a small roller, and provided with a set-screw, by which it can be adjusted to cause said roller to bear against the sprocket-belt G, and thereby tighten the same whenever it may become slack.

Supported by blocks or otherwise on the inner sides of $a\ a'$, at near the top, are springs I, whose ends are bent or turned under and bear upon the rubber D at each end. These springs serve to always maintain the rubber in sufficiently close proximity to the belt $g$ to effect a thorough cleansing of the garments, and they will also allow said rubber to yield to irregular thicknesses of clothing that may be passed under it.

The operation is as follows: The wet garments are taken from the tank A and placed between the rubber and slotted belt at the forward end of the machine. The crank 5 is then turned, and by movement of the belt the garments are carried through to the other end of the machine, where they drop into the projecting end of the inclined trough B and fall back into the tank A, they being subjected to a thorough rubbing by the reciprocating rubber D. This may be repeated as often as necessary for a proper and thorough cleansing. By elevating the crank 5, and moving it back and forth in one-half strokes, the garments will be subjected to a rubbing similar to hand-washing.

The machine is mounted on the trough a short distance from its supported end, so that the clothes acted upon are fed through toward such supported end, where they drop into the projecting portion of the trough, and thence descend to its lower end. The lower end of the trough is placed over and supported by any suitable water-tank.

Having thus described my invention, what I claim is—

The combination of the trough B, provided with supports at one end, and a washing-machine mounted thereon a short distance from the supported end of said trough, the said washing-machine being constructed, substantially as shown, so that the clothes acted upon are fed toward the supported end of the trough, substantially as and for the purpose set forth.

In testimony that I claim the foregoing as my own I affix my signature in presence of two witnesses.

F. McKIMMY.

Witnesses:
I. R. WETHERILL,
J. F. WINGATE.